United States Patent
Doke et al.

(10) Patent No.: US 12,130,906 B2
(45) Date of Patent: Oct. 29, 2024

(54) RECOGNITION BASED MULTI-SKILL-MULTI-SENSORY PASSWORDS WITH DYNAMIC IDENTIFICATION OF SENSOR COMBINATION BASED ON END USER SKILL

(71) Applicant: Tata Consultancy Services Limited, Mumbai (IN)

(72) Inventors: Pankaj Doke, Thane (IN); Karan Rajesh Bhavsar, Thane (IN); Srinivasu Pappula, Hyderabad (IN); Akhilesh Srivastava, Thane (IN); Sujit Shinde, Thane (IN); Sanjay Kimbahune, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 243 days.

(21) Appl. No.: 18/051,200

(22) Filed: Oct. 31, 2022

(65) Prior Publication Data
US 2023/0281297 A1    Sep. 7, 2023

(30) Foreign Application Priority Data

Mar. 1, 2022  (IN) .............................. 202221011117

(51) Int. Cl.
*G06F 21/36*    (2013.01)
*G06F 21/46*    (2013.01)
(Continued)

(52) U.S. Cl.
CPC .......... *G06F 21/46* (2013.01); *G06F 21/6218* (2013.01)

(58) Field of Classification Search
CPC .............................. G06F 21/46; G06F 21/6218
(Continued)

(56) References Cited

U.S. PATENT DOCUMENTS 7,174,462 B2    2/2007    Pering et al.
8,881,251 B1    11/2014   Hilger
(Continued)

FOREIGN PATENT DOCUMENTS

EP    3044925 B1    5/2019
KR    100917748 B1    9/2009

OTHER PUBLICATIONS

Renzhong Wang; Context-Aware Implicit Authentication of Smartphone Users Based on Multi-Sensor Behavior; IEEE:2019; pp. 119654-119667.*

*Primary Examiner* — Monjur Rahim
(74) *Attorney, Agent, or Firm* — FINNEGAN, HENDERSON, FARABOW, GARRETT & DUNNER LLP

(57) ABSTRACT

State of the art authentication mechanisms have limitations when used by Basic Emergent User (BEU). Embodiments herein provide method and system for recognition based multi-skill-multi-sensory passwords with dynamic identification of sensor combination based on end user skill, specifically for the BEU. The method disclosed generates user profile using a task-based technique to determine skill and capability of the user associated with each of a plurality of sensory categories used for generating a multi-skill-multi-sensory password. Each of the plurality of sensory categories are graded is descending order based on user's skill and capability and user is offered to select each password entry from a particular sensor category in accordance with the identified grade in each iteration. Thus, the entropy of password generation in the context of user is split among the sensor categories. Furthermore, recognition-based out of sequence approach is used during user authentication instead of more challenging memorizing-based approach.

18 Claims, 7 Drawing Sheets

(51) Int. Cl.
*G06F 21/62* (2013.01)
*H04L 9/40* (2022.01)

(58) Field of Classification Search
USPC .......................................................... 726/18
See application file for complete search history.

(56) References Cited

U.S. PATENT DOCUMENTS

| | | | |
|---|---|---|---|
| 9,692,758 B2 | 6/2017 | Zeljkovic et al. | |
| 11,500,467 B1* | 11/2022 | Ron | G06F 3/0383 |
| 11,606,354 B2* | 3/2023 | Qian | H04L 63/10 |
| 2017/0011210 A1* | 1/2017 | Cheong | A61B 5/681 |
| 2017/0123498 A1* | 5/2017 | Dillon, Jr. | G06F 3/041 |
| 2020/0220869 A1* | 7/2020 | Singh | G06F 21/32 |
| 2021/0240805 A1* | 8/2021 | Knoppert | G06F 3/023 |
| 2022/0156058 A1* | 5/2022 | Zmijewski | G06V 10/764 |
| 2023/0169161 A1* | 6/2023 | Konda | G06F 21/46 |
| | | | 726/26 |
| 2024/0069639 A1* | 2/2024 | Dobson | G06F 3/015 |

\* cited by examiner

200

202 — generating a user profile for a user of a device using a task-based technique to determine skill and capability of the user for generating a password comprising a combination of a plurality of sensory categories

204 — selecting a unique combination of the identified one or more categories, specifying number of inputs of each category required in the password, wherein the unique combination is selected from an entropy matching tree generated using varying combinations of inputs from each category, wherein an aggregated category entropy of the selected unique combination of the identified one or more categories is greater than or equal to the initial entropy

206 — one by one displaying to the user via a customized layout generation a plurality of options from each category based maximum options identified on the device for each category based on the user preferences determined for each category, wherein the sequence of categories displayed follows the descending order of the assigned grade

208 — generating the customized layout for authentication process indicating the user to recognize an entry in each iteration from among the plurality of options presented from each category among the one or more identified categories present in the generated password

210 — authenticating the user if the recognized and selected input in each iteration matches the generated the password

FIG. 2

RECOGNITION BASED MULTI-SKILL-MULTI-SENSORY PASSWORDS WITH DYNAMIC IDENTIFICATION OF SENSOR COMBINATION BASED ON END USER SKILL

PRIORITY CLAIM

This U.S. patent application claims priority under 35 U.S.C. § 119 to: Indian Patent Application No. 202221011117, filed on 1 Mar. 2022. The entire contents of the aforementioned application are incorporated herein by reference.

TECHNICAL FIELD

The embodiments herein generally relate to field of authentication mechanisms and, more particularly, to a method and system for recognition based multi-skill-multi-sensory passwords with dynamic identification of sensor combination based on end user skill.

BACKGROUND

With the world moving towards complete digitization, digital devices are serving as digital assistants. Digital authentication mechanisms for device access become critical as digital devices are entry points for various applications across domains such as banking, travel booking, device linking to various important user accounts and so on. Device authentication has been a well-researched field, with considerable efforts in identifying and addressing challenges in device handling across different user types such as tech savvy users, visually impaired users, physically challenged users, less-literate users and the like. There are two aspects that need to be looked upon while building authentication mechanisms for digital devices. One aspect is password synthesis or password generation and other is the mechanism designed for password entry for authenticating the user.

The password generation mechanism is expected to increase the attack space for a brute force attacker by enabling generation of strong passwords. However, user's skill and capability play a major role in making use of the strength provided by the password synthesis mechanism. This becomes further challenging when user is a less-literate user, also referred as Basic Emergent User (BEU), where his/her ability to attempt variations or combinations for password generation is limited. Commonly used Character Digit Symbol (CDS) passwords are hard to synthesize for the BEU since a) text entry of CDS on mobile phones is hard and painful, b) CDS passwords from BEU are weak in security, c) CDS passwords have low usability for BEU, and d) sufficiently random CDS passwords cannot be indefinitely generated by the BEU since BEUs saturate in generations of passwords. Thus, specifically for the BEUs a mechanism is required that assists the BEU to utilize the entire password space during password generation increasing his password entropy, which refers to the unpredictability or randomness of password, effectively making it difficult-to-guess by the brute force attacker.

Furthermore, it can be noted that most of the password entry mechanisms that enable the user to authenticate himself totally rely on recall, where the user is required to memorize the password and the sequence of input. This approach is in general a challenge to any type of user since he/she must remember multiple passwords for multiple applications across multiple devices. Obviously, for the BEU, authentication mechanism that requires memorizing is further challenging.

Attempts have been made to use various modalities such as video, audio, haptic and the like for authentication mechanisms. However, mostly the existing methods handle single modality and focus on modality aspect where the device or machine's ability to receive input is considered. The end user's capability with respect to different modalities is not considered nor is much work done to assist the user to improve his entropy, Thus, for a BEU, whose entropy is already poor, this aspect is critical. Furthermore, even though an authentication mechanism is developed considering a user type, existing methods provide standard approach across users of an identified user type. It's obvious and understood that each user may have different capability and skill while using specific modality and may not be comfortable with one or more modalities the device authentication mechanism provides. Each of the existing methods have their own limitations and challenges, specifically when it narrows down to BEUs. The reason being authentication mechanisms are mostly standard across users and not customized for BEUs. The area of usable security is still under active research and the current body of research is focused only on literate users.

Thus, enhancements to build robust authentication mechanism, that are hard for an attacker to crack but are still easy and convenient for the BEU for password synthesis and authentication is an open research area.

SUMMARY

Embodiments of the present disclosure present technological improvements as solutions to one or more of the above-mentioned technical problems recognized by the inventors in conventional systems.

For example, in one embodiment, a method for recognition based multi-skill-multi-sensory passwords is provided. The method includes generating a user profile for a user of a device using a task-based technique to determine skill and capability of the user for generating a password comprising a combination of a plurality of sensory categories, wherein the generating the user profile comprises: a)—assigning a grade among a plurality of predefined grades to the user for each of the plurality of sensory categories, wherein the grade indicates capability level of the user associated with each category, b)—identifying one or more categories from among the plurality of sensory categories with an assigned grade above a grade threshold; c)—arranging the identified one or more categories in descending order of the assigned grade; d)—determining user preferences, to derive a user content probability, associated with each category among the plurality of sensory categories; e)—prompting the user to provide a security preference level and a privacy setting for an end application for which the password is to be generated; f)—determining a password length based on the security preference level and the privacy setting provided by the user, wherein the password length specifies number of inputs required for the password; g)—determining an initial entropy of the user in accordance with the security preference level and the privacy setting provided by the user using a basic character and a digit set for the determined password length; and h)—determining a user location probability that identifies high probability locations on device screen that are frequently accessed by the user.

Further, the method includes selecting a unique combination of the identified one or more categories, wherein the unique combination specifies number of inputs of each of the identified one or more categories required in the password, wherein the unique combination is selected from an entropy matching tree generated using varying combinations of inputs from each category, wherein an aggregated category entropy of the selected unique combination of the identified one or more categories is greater than or equal to the initial entropy. Furthermore, the method includes displaying to the user via a customized layout generation a plurality of options one by one from each category based on maximum options identified on the device for each category based on the user preferences determined for each category, wherein the sequence of categories displayed follows the descending order of the assigned grade.

Furthermore, the method includes generating the customized layout for authentication process, offering the user to recognize an entry in each iteration from among the plurality of options presented from each category among the one or more identified categories present in the generated password, wherein the selection is recognition based; and authenticating the user if the recognized and selected input in each iteration matches the generated the password, wherein the matching is independently performed irrespective of the sequence of the selected input.

In another aspect, a system for recognition based multi-skill-multi-sensory passwords is provided. The system comprises a memory storing instructions, one or more Input/Output (I/O) interfaces, and one or more hardware processors coupled to the memory via the one or more I/O interfaces, wherein the one or more hardware processors are configured by the instructions to generate a user profile for a user of a device using a task-based technique to determine skill and capability of the user for generating a password comprising a combination of a plurality of sensory categories, wherein the generating the user profile comprises: a)—assigning a grade among a plurality of predefined grades to the user for each of the plurality of sensory categories, wherein the grade indicates capability level of the user associated with each category, b)—identifying one or more categories from among the plurality of sensory categories with an assigned grade above a grade threshold; c)—arranging the identified one or more categories in descending order of the assigned grade; d)—determining user preferences, to derive a user content probability, associated with each category among the plurality of sensory categories; e)—prompting the user to provide a security preference level and a privacy setting for an end application for which the password is to be generated; f)—determining a password length based on the security preference level and the privacy setting provided by the user, wherein the password length specifies number of inputs required for the password; g)—determining an initial entropy of the user in accordance with the security preference level and the privacy setting provided by the user using a basic character and a digit set for the determined password length; and h)—determining a user location probability that identifies high probability locations on device screen that are frequently accessed by the user.

Further, the system is configured to select a unique combination of the identified one or more categories, wherein the unique combination specifies number of inputs of each of the identified one or more categories required in the password, wherein the unique combination is selected from an entropy matching tree generated using varying combinations of inputs from each category, wherein an aggregated category entropy of the selected unique combination of the identified one or more categories is greater than or equal to the initial entropy. Furthermore, the method includes displaying to the user via a customized layout generation a plurality of options one by one from each category based on maximum options identified on the device for each category based on the user preferences determined for each category, wherein the sequence of categories displayed follows the descending order of the assigned grade.

Furthermore, the system is configured to generate the customized layout for authentication process, offering the user to recognize an entry in each iteration from among the plurality of options presented from each category among the one or more identified categories present in the generated password, wherein the selection is recognition based; and authenticating the user if the recognized and selected input in each iteration matches the generated the password, wherein the matching is independently performed irrespective of the sequence of the selected input.

In yet another aspect, there are provided one or more non-transitory machine-readable information storage mediums comprising one or more instructions, which when executed by one or more hardware processors causes a method for recognition based multi-skill-multi-sensory passwords.

The Method Includes

The method includes generating a user profile for a user of a device using a task-based technique to determine skill and capability of the user for generating a password comprising a combination of a plurality of sensory categories, wherein the generating the user profile comprises: a)—assigning a grade among a plurality of predefined grades to the user for each of the plurality of sensory categories, wherein the grade indicates capability level of the user associated with each category, b)—identifying one or more categories from among the plurality of sensory categories with an assigned grade above a grade threshold; c)—arranging the identified one or more categories in descending order of the assigned grade; d)—determining user preferences, to derive a user content probability, associated with each category among the plurality of sensory categories; e)—prompting the user to provide a security preference level and a privacy setting for an end application for which the password is to be generated; f)—determining a password length based on the security preference level and the privacy setting provided by the user, wherein the password length specifies number of inputs required for the password; g)—determining an initial entropy of the user in accordance with the security preference level and the privacy setting provided by the user using a basic character and a digit set for the determined password length; and h)—determining a user location probability that identifies high probability locations on device screen that are frequently accessed by the user.

Further, the method includes selecting a unique combination of the identified one or more categories, wherein the unique combination specifies number of inputs of each of the identified one or more categories required in the password, wherein the unique combination is selected from an entropy matching tree generated using varying combinations of inputs from each category, wherein an aggregated category entropy of the selected unique combination of the identified one or more categories is greater than or equal to the initial entropy. Furthermore, the method includes displaying to the user via a customized layout generation a plurality of options one by one from each category based on maximum options identified on the device for each category based on the user preferences determined for each category, wherein the sequence of categories displayed follows the descending order of the assigned grade.

Furthermore, the method includes generating the customized layout for authentication process, offering the user to recognize an entry in each iteration from among the plurality of options presented from each category among the one or more identified categories present in the generated password, wherein the selection is recognition based; and authenticating the user if the recognized and selected input in each iteration matches the generated the password, wherein the matching is independently performed irrespective of the sequence of the selected input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method for recognition based multi-skill-multi-sensory passwords, using the system of FIG. 1, in accordance with some embodiments of the present disclosure.

Figure 1:
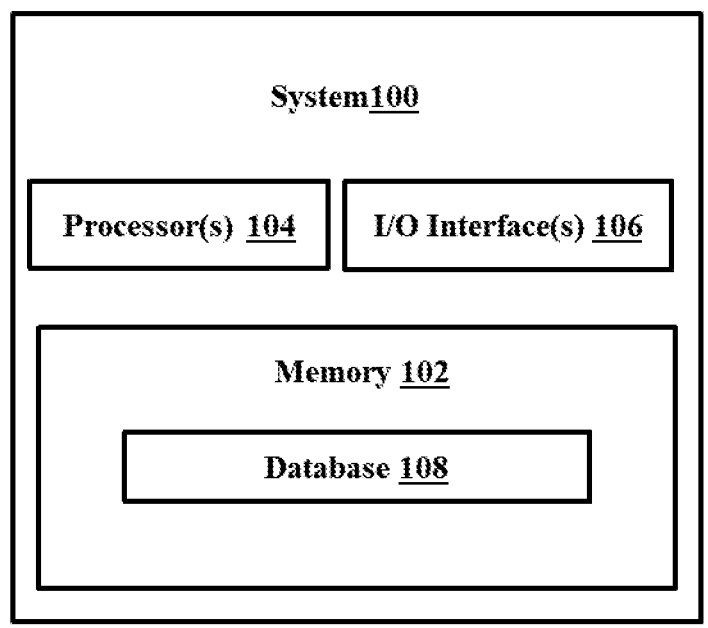
FIG. 1 is a functional block diagram of a system, for recognition based multi-skill-multi-sensory passwords, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The challenge of generating password is about generating entropy by humans. Now, contemporarily the aids for generating entropy are digits and English alphabets. However, as mentioned in the background section Basic Emergent Users (BEUs) have a challenge with this. They have limited ability to generate digit based good passwords, That is because their digit entropy is very poor since instead of the concept of 'entropy' they choose numbers which are recallable or contextually relevant to them (such as date of birth) and apart from this, instead of treating the numbers as a decimal display of random binary representations, they treat them as paired digit (couplets) in case of 4 or more digits passwords—thus a 4-digit password is treated as a pair of 2-digits such as 2022 the current year. Thus the 'singular' digit is now reduced to 'pairs' of digits—effectively halving the length of the password. So, passwords generated by the BEUs are very easy to crack. The other challenge is that generating set for digits is 0-9, that is only ten symbols, and the pool to generate is also limited due to the entire spectrum of space available, and thereafter the conceptual modelling by BEU. Hence the passwords generated by the BEU are weaker and easy to guess. For a fixed length of passwords, password length is normally 4 digits or 6 digits for most of the transactions. On the other hand, the English alphabet has a larger pool of symbols, specifically A-Z with 26 characters. Additionally with upper case and lower case, it becomes 2×26 that is 52. Special characters and digits are further included to increase the pool. However, despite this the entropy generation is limited and hampered, primarily because of the language skills of the user, their cognitive abilities in the context of a foreign language and ability to conceptually model the concept of a password as understood/represent from the computer point of view. and the size of keyboard on the phone. Further, it can be noted that, when the alphabet set 'a-z' is provided to a user, irrespective of any type of user, the user does not generate random sequence of alphabets but tend to generate words. Thus, the unit is not a character but a word and the ability to generate unique passwords is co-related to the ability to generate words at the unit level. The BEU has a limited foreign language, for example 'English' vocabulary that is widely used for authentication, which further reduces the ability to generate words. Rather, mostly BEUs are limited to using their names, common words/nouns, which effectively it does not exceed a few tens of words. Thus, due to the inherent cognitive and language skills of the BEU, the ability to generate passwords with good entropy is severely limited and prone to compromise.

Apart from this, the other challenge for BEU is text entry on the smartphone. The layout of the keyboard and switching between alphabets, digits and symbols reduces the speed at which BEU can enter the password. Further to this, the text entry of a password on a smartphone is susceptible to shoulder surfing. The other challenge with respect to the BEU is password interference. This is due to the BEU's limited ability to generate unique passwords when the BEU is faced with multiple password creations for multiple applications. It is observed that the BEU, (interchangeably referred to as user or end user) on an average if has 15 plus applications, tends to confuse password used for one application with another, with assumption that the password is unique for each. Practically, since the BEU cannot generate 15 unique passwords and keep changing them every month, it results in password reuse. That is the BEU tends to keep the same password for all the apps. As well understood, this is one of the most insecure approaches, since knowing one password compromises all passwords and corresponding applications. Apart from this, the ability to generate unique passwords infinitely or over longer or larger cycles, by adhering to the standard constraints of not using the last ten or twenty passwords, is additional challenge for the BEU. Thus, considering the BEU as an entropy generating machine with the input token limited to either digits or English language symbols or computer symbols in a smartphone, is severely constrained and restricted, thereby making them vulnerable to attacks such as brute force or man in middle attacks. Furthermore, recall based authentication, wherein the BEU must memorize the passwords and thereafter rightly enter them in a predefined sequence during device or application (end utility) authentication, as discussed in the background section, is always a challenge. Thus, the above technical challenge remains unaddressed.

Embodiments herein provide a method and system for recognition based multi-skill-multi-sensory passwords with dynamic identification of sensor combination based on end user skill, specifically for a Basic Emergent User (BEU), who is a less-literate user. The method disclosed generates a user profile using a task-based technique to determine skill and capability of the end user associated with each of a plurality of sensory categories used for generating a multi-skill-multi-sensory password, hereinafter referred as password. Each of the plurality of sensory categories are graded is descending order based on user's skill and capability and user is dynamically offered to select each password entry from a particular sensor category in accordance with the identified grade in each iteration. Thus, the entropy of password in the context of user is split among the plurality of sensor categories. Furthermore, recognition-based approach is used during user authentication instead of more challenging recall-based approach. Furthermore, a customized layout is generated by merging a user location probability referring to device screen hotspots and a user content probability obtained from user preferences that prompts user to bring in variety in selection of inputs in each category.

Thus, even with skill and capability limitation of the BEU, the method disclosed offers strong password generation, which is easier for the BEU to synthesize and authenticate.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of a system 100 for recognition based multi-skill-multi-sensory passwords, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like, which require an authentication mechanism for access or access of specific end application of interest to the user.

The I/O interface(s) 106 can include a variety of software and hardware interfaces, for example, a web interface, a graphical user interface (a Grid Display interface) to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes modules and sub-modules (not shown) that generate user profile of a user of a device, entropy matching trees, customized layouts and the like. Further, the memory 102 may comprise information pertaining to input(s)/output(s) of each step performed by the processor(s) 104 of the system 100 and methods of the present disclosure. Further, the memory 102 includes a database 108 that may store a plurality of tasks that the user is asked to perform to generate the user profile. In an embodiment, the database 108 may be external (not shown) to the system 100 and coupled to the system via the I/O interface 106. Functions of the components of the system 100 are explained in conjunction with flow diagram of FIG. 2.

FIG. 2 is a flow diagram illustrating a method 200 for recognition based multi-skill-multi-sensory passwords, using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The method 200, is explained specifically in context of the BEU, with plurality of sensory categories offered by the system 100 (user's device) as video (V), audio (A) and haptic (H), as an illustrative example, and not to be construed as a limitation. The user can select one or more images from those that are made available to him from among a plurality of images stored on the device. Similarly, options are provided to the user for each category. However, it can be understood by a person with ordinary skill in the art that the system can be customized to the skill and capability of any user type and can offer additional sensory categories, still being within the scope of the method disclosed.

Referring to the steps of the method 200, at step 202 of the method 200, the one or more hardware processors 104 generate a user profile for a user of a device using a task-based technique to determine skill and capability of user for generating the password comprising a combination of the plurality of sensory categories. The user profile generation enables the system 100 to understand the skill and capability of the user of the device, herein the BEU, and accordingly assist the less literate user to synthesize a strong password with ease.

Figure 3A:
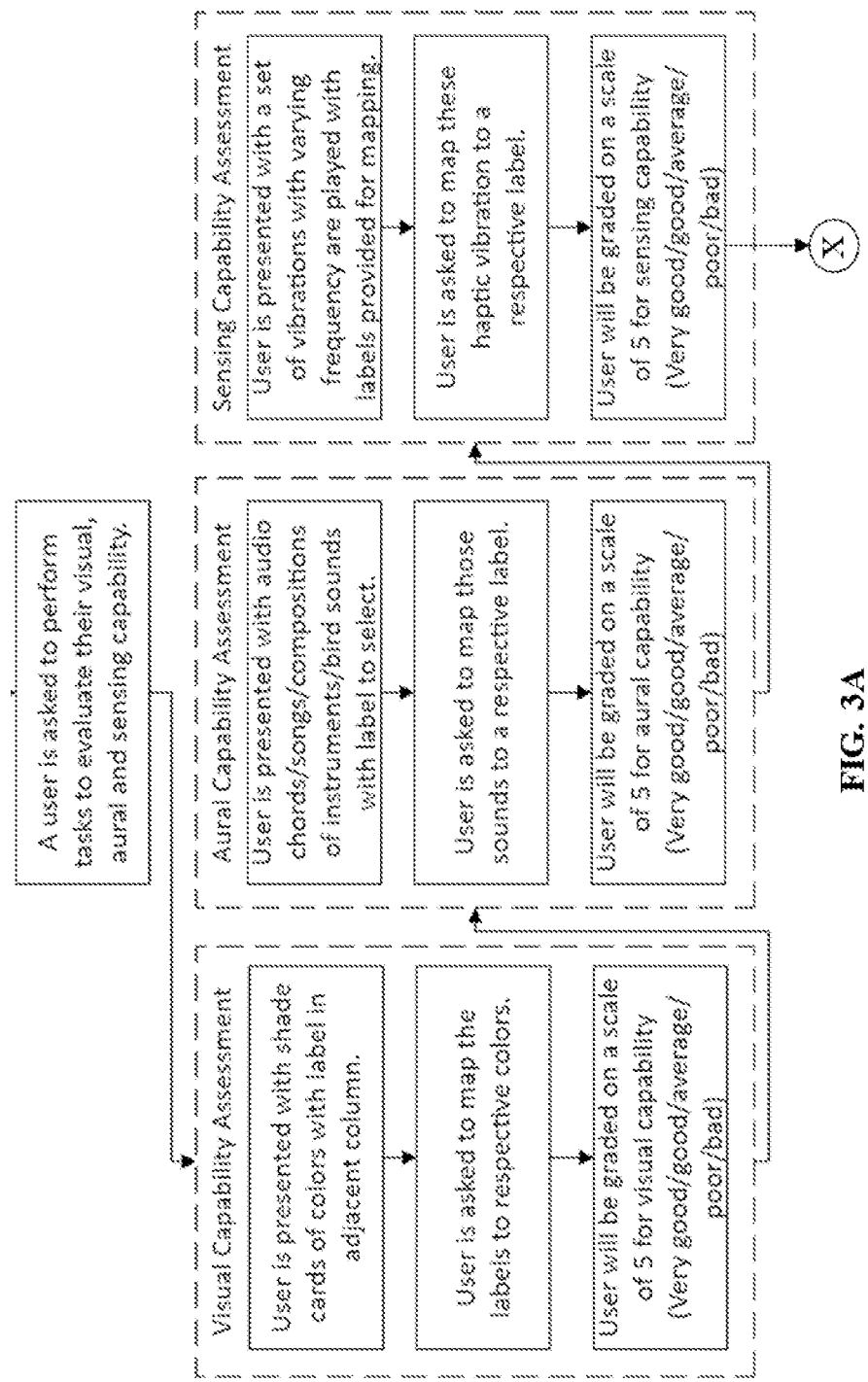
FIGS. 3A and 3B (collectively referred as FIG. 3) depict user profile generation for a multi-skill-multi-sensory password, in accordance with some embodiments of the present disclosure.
Figure 3B:
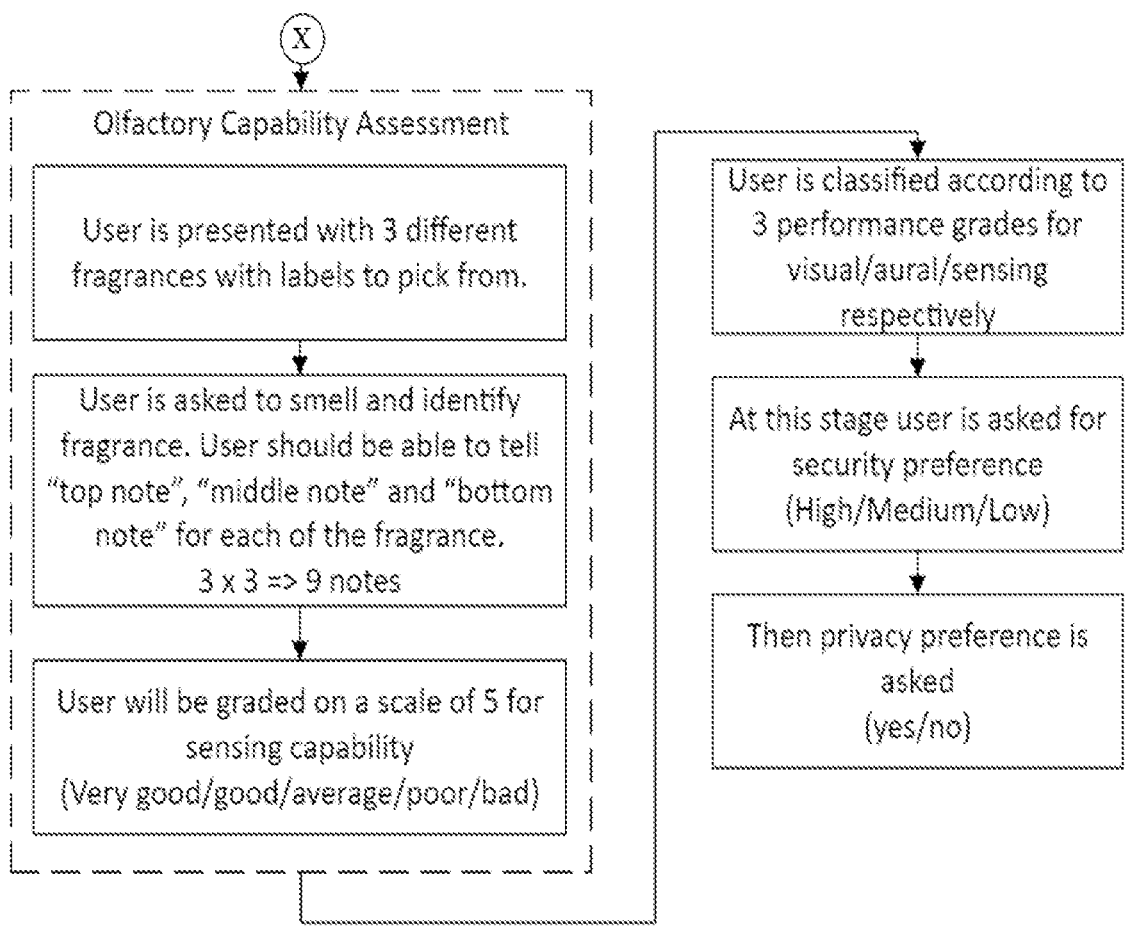

During user profile generation, also referred as user profiling, the user (BEU) is asked to undergo a plurality of tasks and may be asked to respond to a set of questionnaires. A user profiling process extracts and stores the information related to the user's skill and capability, and the end application for which user intends to generate the password. The user profiling is further explained with an example in conjunction with FIGS. 3A and 3B (collectively referred as FIG. 3). The user profiling process comprises:
  a) Assigning a grade among a plurality of predefined grades to the user for each of the plurality of sensory categories, wherein the grade indicates capability level of the user associated with each category. For example, as depicted in FIG. 3, the plurality of sensory categories include but are not limited to video, audio, haptic and olfactory. The user is made to undergo tasks from each category and the predefined grades such as highly capable, moderately capable and poor, are assigned to user.
  b) Once the grades are assigned, one or more categories from among the plurality of categories with assigned grade above a grade threshold are identified. For example, if the user is assigned the grade as 'poor' in a specific category, there is no point in selecting that category as one of the sensory categories as mode of input during password generation or synthesis.
  c) The identified one or more categories, which are the highly capable, and the moderately capable are arranged in descending order of the assigned grade. This information extracted enables the system 100 to understand the categories user will be more comfortable with both during password generation and authentication.
  d) Further, in each category such as video, audio, haptic or olfactory, where user has demonstrated capability above the threshold, user may have his/her own preferences that are bound to affect his selection of images, audio, haptic. It is critical to extract this information, which is done by analyzing user's response to selection-based tasks. The analyzed information enables to identify user preferences. For example, when the user is asked to perform random image selection, from a displayed set of images from the ones available on the system 100, he/she may be naturally inclined to pick images of a favorite person, favorite location etc. The user preferences so extracted are used to derive a user content probability indicating probability that the user selects an image of A-type or B-type and so on. Thus, user content probability provides information on user's biases and/or preferences for certain content captured/represented within media types such as visual (image/video), aural, haptic. It can be understood that user content probability is very specific to the user and is captured by the system in the user profile, to later bring in customization the manner content of each category is displayed to user during password generation and authentication.
  e) Furthermore, for an end application of interest, for which the user intends to generate a password, the user is prompted to provide a security preference level and a privacy setting. The security preference level comprises high security, medium and low security, wherein the privacy setting can be set to 'yes' or 'no', as depicted in FIG. 3B. In an embodiment, the BEU can be guided for identifying the security preference level and the privacy setting based on the end application, which is of interest to the user. For example, security preference levels for 'banking' or 'payments' apps are mapped to high, while security preference level for apps such as 'search' or 'radio' are mapped to low security, and others are mapped to either medium or high security based on the selection done by the BEU. So, a BEU might use messaging apps as medium to communicate and hence can set is as low security, while if used for payment might is set as high security. The privacy setting is mapped to either '0' (publicly accessible) or '1' (private—only for the BEU).
  f) Once privacy setting and security preference level are obtained, then a password length based on the security preference level provided by the user is computed using well-known standard applications or software. For example, National Institute of Standards and Technology (US) provides services to get appropriate password lengths. The length of the password specifies number of inputs required for the password. For example, say the password length can be 4-character, 6-character and so on.
  g) Further, initial entropy of the user is determined by asking user to perform a task such as generating say, X, Y, Z or maximum unique passwords using basic character and digit set for the determined password length. The initial entropy is represented as E(password), which derived from the maximum password user could generate during the task. It can be noted as explained earlier, any user generally selects the password not based on each character, but a word that in his limited vocabulary. Thus, the unit is not a character but a word. This limits the entropy or randomness of user in generating unique/distinct passwords, as understood this randomness or entropy further drops when user is the BEU. Entropy of any password=E=Length of Password×LogBase2 NumberOfSymbols. So, for a 4-digit password, 4-Symbol Length (hence N=4) and 10 symbols (0-9) hence 4×logBase2(10) is the entropy offered by a DigitKeypad for a 4-digit password. However, the BEU is unable to use the entire entropy made available and able generate K unique passwords, effectively reducing his/her entropy to K.
  h) Finally, during the user profiling, a user location probability, on the Grid Display interface wherein the content is placed to be displayed to the user, is determined that identifies high probability locations on device screen that are frequently accessed by the user. The user location probability indicates hotspots on device screen, indication probability of user to select from a location coordinate (x,y) on the device screen thus providing information of user's preference for locations where content or media is displayed. Similarly, to the user content probability, the user location probability information is specific to user and is extracted by the system 100 using task-based approach. For example, user may be asked to select random numbers from displayed set, or random images from a displayed set. It can be noticed that based on user's physical handling of the device, user is bound to pick content at certain location (x1, y1), (x2, y2) more frequently than the odd locations say (x3, y3) or the like on screen. As well known, this is specifically related to way the user holds the device and the ease with which he/she can move his fingers across the locations on the device screen.

Example tasks used during user profiling are explained. When the BEU logs on, the BEU is presented a set of tasks to ascertain the skill and capability of the BEU in each category or channel. Before execution of the tasks, the BEU self-identifies himself/herself to one of the n×m socio-culturally identified skills and/or arts, which for the Indian context are 8×8=64 and shown as grid with 8×8 with visual. The BEU selects minimum 3 skills from this grid and not more than 5. The tasks subsequently presented to the BEU are then pertaining to those skills and/or arts as self-identified by the BEU. The tasks are as follows. Task one related to the video (V) category presents a Shade Card of a particular color such as Blue with labels in an adjacent column. The BEU is asked to map the label to different shades of the color. A particular BEU, say an artist or painter, would be better able to do the mapping of the color than say a barber or a mason. Similarly, task two related to the audio (A) category presents a set of audio chords/songs/composition of instruments and bird sounds are shown to the BEU and the BEU is asked to map it to a label. In this case too, a BEU with acute sense of differentiation between voices/audio would be able to ascertain the different audio mapping. Thus, a musician or a folk singer is likely to perform better than a barber or a mason. Similarly for the third part related to the haptic (H) category, a set of vibrations with varying frequency components is played with mapping provided (for the BEU to categorize). Here too, a person for example who does 'naadi pariksha' (pulse testing) would be better able to differentiate between the different classes of haptic vibrations as compared to a barber or a mason. Thus, with these 3 examples of classification, the BEU can be say graded on five levels of competency on each sensory category or sensory channel. That is in the '3 channel'×'5 levels' (dimension) space, every BEU can be placed. Any BEU whose mapping lies on the higher dimension of that channel would have a higher performance for that channel in terms of usability.

Once the user profile is generated, at step 204 of the method 200, the one or more hardware processors 104 select a unique combination of the identified one or more categories, specifying number of inputs of each category required in the password. The unique combination is selected from an entropy matching tree generated using varying combinations of inputs from each category. The selected unique combination is such that an aggregated category entropy of the selected unique combination of the identified one or more categories is greater than or equal to the initial entropy.

The method splits the entropy generated by a single mode or choice such as Digits (0-9) into multiple sensory elements, for example, (visual, aural, haptic, count −3) such that the entropy remains the same or increases but the usability necessarily increases by a delta. The system comprises of automatically (machine based) splitting the entropy and offering the user a choice based on the capabilities of the user (BEU), so that the user can choose what makes the user (BEU) most happy or comfortable is password selection, enhancing user experience. For example, as mentioned earlier, entropy for a 4-digit pin 4×logBase2(10). Then this value can be the same for Exlog3. E is the length of the password per sensory channel. So, V can be arrived at either by having say 3 Photos and 1 Audio or 2 Photos and 2 Audio. These choices of 2(2P,2A) and (3P,1A) could be presented to the BEU and the BEU can choose what makes her/him the happiest. The system 100 uses Photos on the mobile phone of the user to increase the corpus available to photos for increasing or decreasing the entropy based on a fixed length. Similarly for Audio and Haptic sensing.

Figure 4:
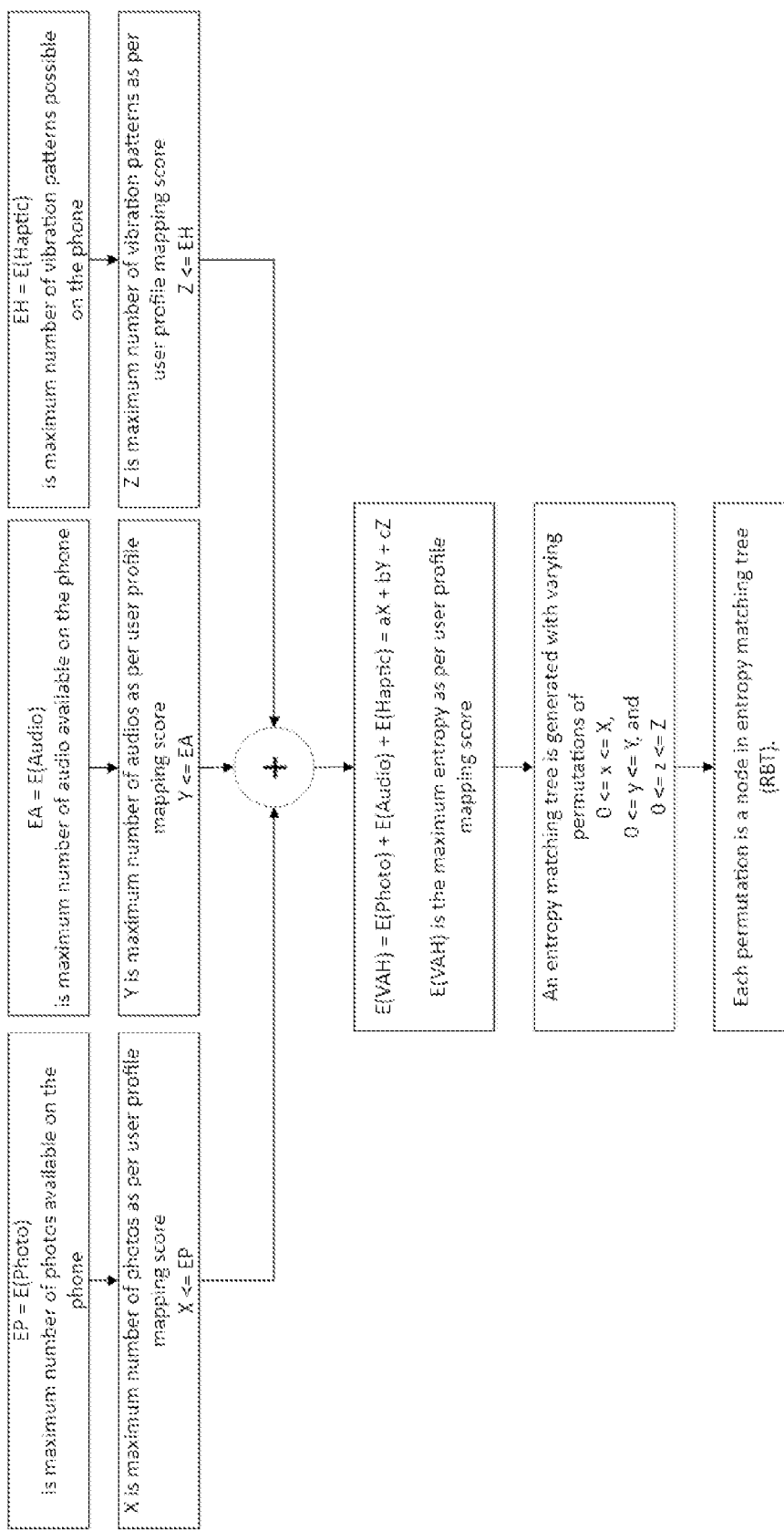
FIG. 4 depicts generation of an entropy matching tree, in accordance with some embodiments of the present disclosure.

FIG. 4 depicts generation of entropy matching tree. For example, say the user device (system 100) has P photos, A audios and H haptic options. Thus, the entropy indicating randomness in combination with available photo, audio and haptic selection (each category) with respect to device context is E(P), E(A) and E(H), wherein the aggregated entropy, also referred to as maximum entropy, offered by the device is, E(VAH)=E(P)+E(A)+E(H). However, from user profile it is identified that user is likely to select only X-photos, Y-audios and Z-haptic vibrations, as they are relevant to the user. Thus, the maximum or aggregated entropy can be defined by equation below:

$$E(VAH)=E(P)+E(A)+E(H)=aX+bY+cZ \quad (1)$$

The coefficients (a, b, c) are determined automatically, were a is the entropy offered by x {Visual (Photos)}, b is the entropy offered by y (Audio) and c is the entropy offered by z (Haptic). The values variables x, y, z in the equation 1, are varied from 0 to X, Y and Z respectively for each category while they satisfy equation 1. This generates a plurality of combinations of x photos, y audios and z haptic vibrations creating an entropy matching tree in accordance with E(VAH). Each combination (x,y,z) is unique and is a node in the entropy matching tree, referred to as Red-Black Tree (RBT).

Figure 5:
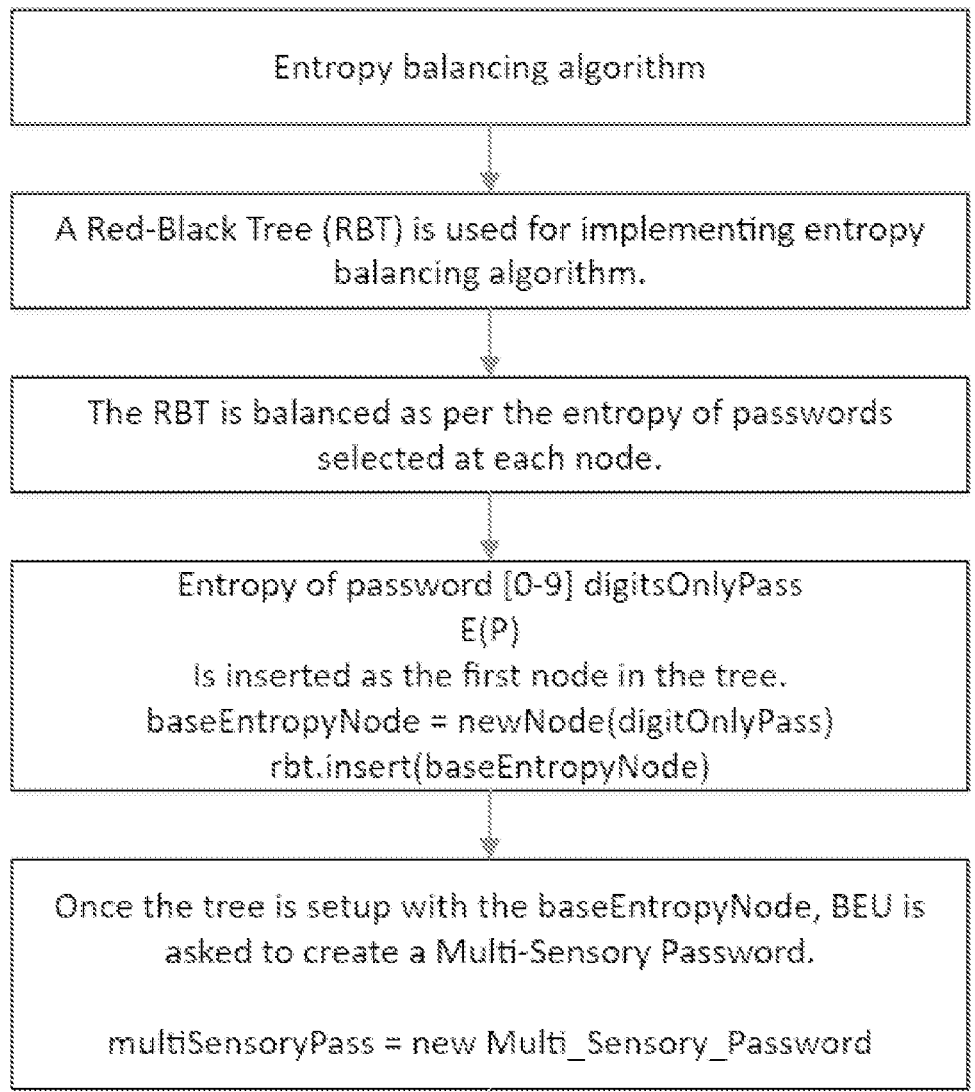
FIG. 5 depicts balancing of the entropy matching tree, in accordance with some embodiments of the present disclosure.
Figure 6:
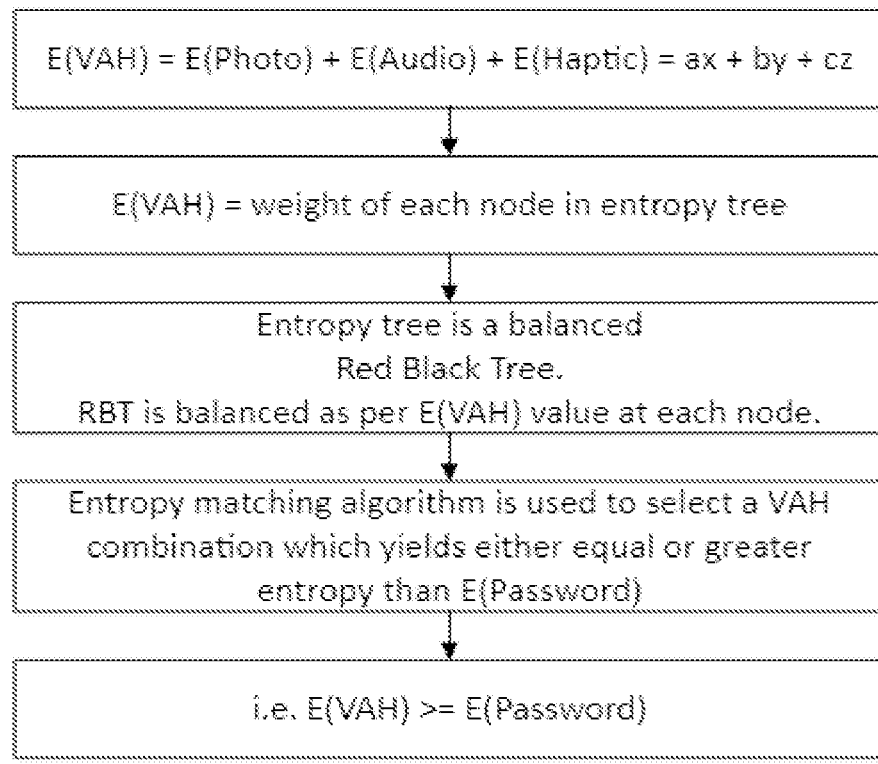
FIG. 6 depicts selection of a unique combination of the plurality of sensory categories from the balanced entropy matching tree, in accordance with some embodiments of the present disclosure.

FIG. 5, depicts entropy balancing technique, which balances the RBT as per entropy of the unique combination at each node. The RBT is balanced at each node as per entropy of the password (initial entropy), wherein the initial entropy in the base or root node. As depicted in FIG. 6, from among these combinations of the balanced entropy matching tree, a unique combination is selected, for which the E(VAH) or the aggregated entropy is greater than or equal to the initial entropy, E(password), identified during user profiling. This ensures that the system 100 pushes the user's capability to improve his entropy while using the multi-sensory mechanism for password generation above the basic or initial entropy that user was capable of, when the basic digit/character-based mode of password generation was offered to the user.

At step 206 of the method 200, the one or more hardware processors 104 one by one display to the end user, via a customized layout generation on the Grid Display interface, a plurality of options from each category based maximum options identified on the device for each category based on the user preferences determined for each category. The sequence of categories displayed follows the descending order of the assigned grade. The customized layout is generated by merging the user location probability and the user content probability obtained from generated user profile. The customized layout is designed to prompt the user to bring in variation in selection of content for inputs in each category. For example, say the user content probability for (V) category indicates user's inclination towards images having a photo of a specific personality, while the user location probability indicates user is inclined towards selecting options displayed on the Grid Display interface at top right and top left parts of screen, and is least inclined towards selection from bottom right location on the device screen, then, the system 100 ensures that it does not each time display user preferences at most probable device screen locations. This enables diverting the user to choose variations in the password inputs rather than selection a favorite type of image in each iteration, effectively enhancing the user's entropy, by reducing the predictability of selection. This further increases the attack space for the attacker.

Once the password is generated, which happens less frequently, the user is required to authenticate himself while using the end application. This happens more frequently. Thus, at step 208 of the method 200, the one or more hardware processors 104 generate the customized layout for authentication process indicating the user to recognize an entry in each iteration from among the plurality of options presented from each category among the one or more identified categories present in the generated password. The selection is recognition based hence the BEU need not memorize and recall but just need to recognize form the displayed options, which is an easier task for him. However, since the displayed images or audio clips in the corresponding category are customized selections, and further are displayed during authentication process such that the right option which is input for the password is not at general device screen hotspot locations, which adds further challenge in cracking the password when attempted by an attacker.

At step 210 of the method 200, the one or more hardware processors 104 authenticate the user if the recognized and selected input in each iteration matches the generated the password, wherein the matching is independently performed irrespective of the sequence of the selected entry. This reduces chances of small sequence error, which may otherwise cause challenge for BEU while going through the authentication process.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Thus, the method and system disclosed herein combines multiple senses into one unified password (audio/visual/tactile etc. as one cohesive unit) and is efficient from usable security. Existing passwords, use text/number/special symbols etc. The idea presented here uses BEU's (human) sensing ability to form a password. Hearing ability, visual ability and sensitivity to touch as a password component. The increase in usability from 1 channel (of only digits and characters) to multi-channel (multi-sensory space). So conventional passwords are one dimensional, whereas the method disclosed splits this into multi-dimensional space with standard password entropy It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for recognition based multi-skill-multi-sensory passwords, the method further comprising:
generating, by one or more hardware processors, a user profile for a user of a device using a task-based technique to determine skill and capability of the user for generating a password further comprising a combination of a plurality of sensory categories, wherein the generating the user profile comprises:
 a) assigning a grade among a plurality of predefined grades to the user for each of the plurality of sensory categories, wherein the grade indicates capability level of the user associated with each category;
 b) identifying one or more categories from among the plurality of sensory categories with an assigned grade above a grade threshold;
 c) arranging the identified one or more categories in descending order of the assigned grade;
 d) determining user preferences, to derive a user content probability, associated with each category among the plurality of sensory categories;
 e) prompting the user to provide a security preference level and a privacy setting for an end application for which the password is to be generated;
 f) determining a password length based on the security preference level and the privacy setting provided by the user, wherein the password length specifies number of inputs required for the password;
 g) determining an initial entropy of the user in accordance with the security preference level and the privacy setting provided by the user using a basic character and a digit set for the determined password length; and
 h) determining a user location probability that identifies high probability locations on device screen that are frequently accessed by the user;
selecting, by the one or more hardware processors, a unique combination of the identified one or more categories, wherein the unique combination specifies number of inputs of each of the identified one or more categories required in the password, wherein the unique combination is selected from an entropy matching tree generated using varying combinations of inputs from each category, wherein an aggregated category entropy of the selected unique combination of the identified one or more categories is greater than or equal to the initial entropy; and
displaying, by the one or more hardware processors, to the user via a customized layout generation a plurality of options one by one from each category based maximum options identified on the device for each category based on the user preferences determined for each category, wherein the sequence of categories displayed follows the descending order of the assigned grade.

2. The method of claim 1, the method further comprising:
generating, by the one or more hardware processors, the customized layout for authentication process, offering the user to recognize an entry in each iteration from among the plurality of options presented from each category among the one or more identified categories present in the generated password, wherein the selection is recognition based; and
authenticating, by the one or more hardware processors, the user if the recognized and selected input in each iteration matches the generated the password, wherein the matching is independently performed irrespective of the sequence of the selected input.

3. The method of claim 1, wherein the customized layout is generated by merging the user location probability and the user content probability obtained from generated user profile, wherein the customized layout is designed to prompt the user to bring in variation in selection of content for inputs in each category.

4. The method of claim 1, wherein the plurality of sensory categories comprises a visual category, an aural category, a haptic sensing category and an olfactory category.

5. The method of claim 1, wherein the security preference level comprises high security, medium security and low security, and wherein the privacy setting is one of 'yes' and 'no'.

6. The method of claim 1, wherein the user is a Basic Emergent User (BEU).

7. A system for recognition based multi-skill-multi-sensory passwords, the system further comprising:
a memory storing instructions;
one or more Input/Output (I/O) interfaces; and
one or more hardware processors coupled to the memory via the one or more I/O interfaces, wherein the one or more hardware processors are configured by the instructions to:
generate a user profile for a user of a device using a task-based technique to determine skill and capability of the user for generating a password further comprising a combination of a plurality of sensory categories, wherein the generating the user profile comprises:
 a) assigning a grade among a plurality of predefined grades to the user for each of the plurality of sensory categories, wherein the grade indicates capability level of the user associated with each category;
 b) identifying one or more categories from among the plurality of sensory categories with an assigned grade above a grade threshold;
 c) arranging the identified one or more categories in descending order of the assigned grade;
 d) determining user preferences, to derive a user content probability, associated with each category among the plurality of sensory categories;
 e) prompting the user to provide a security preference level and a privacy setting for an end application for which the password is to be generated;
 f) determining a password length based on the security preference level and the privacy setting provided by the user, wherein the password length specifies number of inputs required for the password;
 g) determining an initial entropy of the user in accordance with the security preference level and the privacy setting provided by the user using a basic character and a digit set for the determined password length; and
 h) determining a user location probability that identifies high probability locations on device screen that are frequently accessed by the user;
select a unique combination of the identified one or more categories, wherein the unique combination specifies number of inputs of each of the identified one or more categories required in the password, wherein the unique combination is selected from an entropy matching tree generated using varying combinations of inputs from each category, wherein an aggregated category entropy of the selected unique combination of the identified one or more categories is greater than or equal to the initial entropy; and display to the user via a customized layout generation a plurality of options one by one from each category based maximum options identified on the device for each category based on the user preferences determined for each category, wherein the sequence of categories displayed follows the descending order of the assigned grade.

8. The system of claim 7, wherein the one or more hardware processors are further configured to:

generate the customized layout for authentication process, offering the user to recognize an entry in each iteration from among the plurality of options presented from each category among the one or more identified categories present in the generated password, wherein the selection is recognition based; and authenticate the user if the recognized and selected input in each iteration matches the generated the password, wherein the matching is independently performed irrespective of the sequence of the selected input.

9. The system of claim 7, wherein the customized layout is generated by merging the user location probability and the user content probability obtained from generated user profile, wherein the customized layout is designed to prompt the user to bring in variation in selection of content for inputs in each category.

10. The system of claim 7, wherein the plurality of sensory categories comprises a visual category, an aural category, a haptic sensing category and an olfactory category.

11. The system of claim 7, wherein the security preference level comprises high security, medium security and low security, and wherein the privacy setting is one of 'yes' and 'no'.

12. The system of claim 7, wherein the user is a Basic Emergent User (BEU).

13. One or more non-transitory machine-readable information storage mediums comprising one or more instructions which when executed by one or more hardware processors cause:

generating a user profile for a user of a device using a task-based technique to determine skill and capability of the user for generating a password further comprising a combination of a plurality of sensory categories, wherein the generating the user profile comprises:

a) assigning a grade among a plurality of predefined grades to the user for each of the plurality of sensory categories, wherein the grade indicates capability level of the user associated with each category;

b) identifying one or more categories from among the plurality of sensory categories with an assigned grade above a grade threshold;

c) arranging the identified one or more categories in descending order of the assigned grade;

d) determining user preferences, to derive a user content probability, associated with each category among the plurality of sensory categories;

e) prompting the user to provide a security preference level and a privacy setting for an end application for which the password is to be generated;

f) determining a password length based on the security preference level and the privacy setting provided by the user, wherein the password length specifies number of inputs required for the password;

g) determining an initial entropy of the user in accordance with the security preference level and the privacy setting provided by the user using a basic character and a digit set for the determined password length; and h) determining a user location probability that identifies high probability locations on device screen that are frequently accessed by the user;

selecting a unique combination of the identified one or more categories, wherein the unique combination specifies number of inputs of each of the identified one or more categories required in the password, wherein the unique combination is selected from an entropy matching tree generated using varying combinations of inputs from each category, wherein an aggregated category entropy of the selected unique combination of the identified one or more categories is greater than or equal to the initial entropy; and displaying to the user via a customized layout generation a plurality of options one by one from each category based maximum options identified on the device for each category based on the user preferences determined for each category, wherein the sequence of categories displayed follows the descending order of the assigned grade.

14. The one or more non-transitory machine-readable information storage mediums of claim 13, wherein the one or more instructions which when executed by the one or more hardware processors further cause:

generating the customized layout for authentication process, offering the user to recognize an entry in each iteration from among the plurality of options presented from each category among the one or more identified categories present in the generated password, wherein the selection is recognition based; and authenticating the user if the recognized and selected input in each iteration matches the generated the password, wherein the matching is independently performed irrespective of the sequence of the selected input.

15. The one or more non-transitory machine-readable information storage mediums of claim 13, wherein the customized layout is generated by merging the user location probability and the user content probability obtained from generated user profile, wherein the customized layout is designed to prompt the user to bring in variation in selection of content for inputs in each category.

16. The one or more non-transitory machine-readable information storage mediums of claim 13, wherein the plurality of sensory categories comprises a visual category, an aural category, a haptic sensing category and an olfactory category.

17. The one or more non-transitory machine-readable information storage mediums of claim 13, wherein the security preference level comprises high security, medium security and low security, and wherein the privacy setting is one of 'yes' and 'no'.

18. The one or more non-transitory machine-readable information storage mediums of claim 13, wherein the user is a Basic Emergent User (BEU).

* * * * *